A. WELIN.
DAVIT FOR HOISTING AND LOWERING BOATS.
APPLICATION FILED MAY 7, 1908.
958,340.
Patented May 17, 1910.
2 SHEETS—SHEET 1.
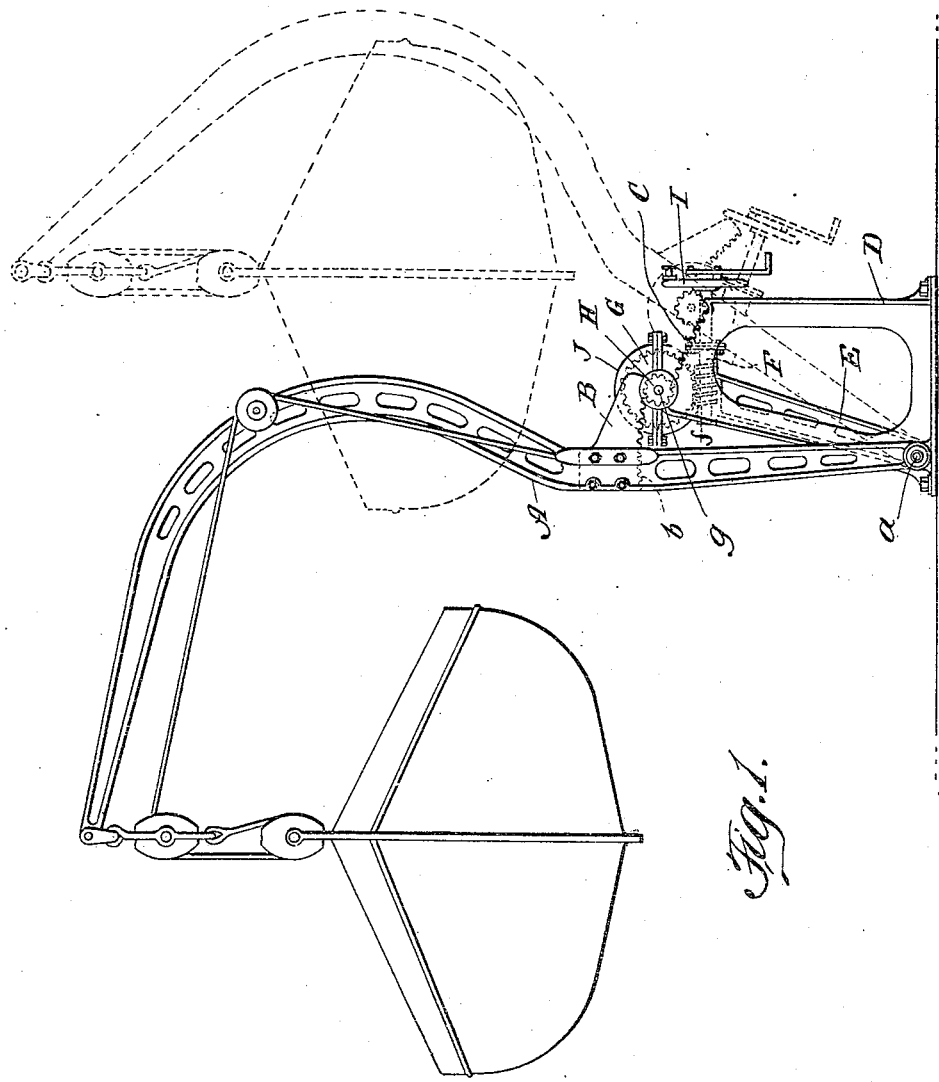
WITNESSES:
INVENTOR
Axel Welin
BY
ATTORNEYS A. WELIN.
DAVIT FOR HOISTING AND LOWERING BOATS.
APPLICATION FILED MAY 7, 1908.
958,340.
Patented May 17, 1910.
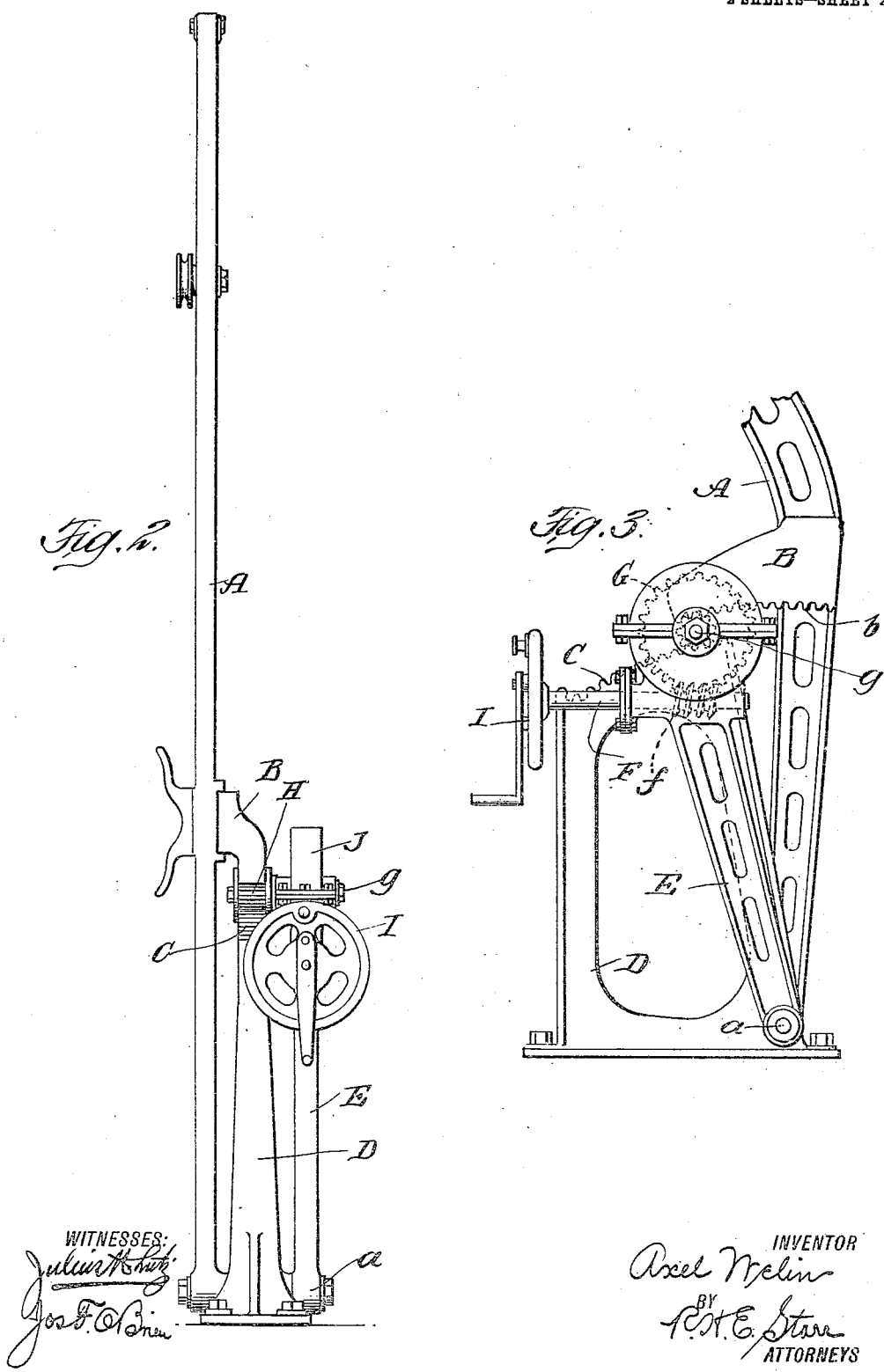

UNITED STATES PATENT OFFICE.

AXEL WELIN, OF LONDON, ENGLAND, ASSIGNOR TO WELIN DAVIT AND LANE & DE GROOT CO., CONSOLIDATED.

DAVIT FOR HOISTING AND LOWERING BOATS.

958,340.  Specification of Letters Patent.  Patented May 17, 1910.

Application filed May 7, 1908. Serial No. 431,338.

*To all whom it may concern:*

Be it known that I, AXEL WELIN, a subject of the King of Sweden, and a resident of London, England, have invented certain new and useful Improvements in Davits for Hoisting and Lowering Boats, of which the following is a specification.

This invention relates to davits for hoisting and lowering boats and is particularly adapted for use on yachts and other vessels of this class, where boats of comparatively light weight are employed.

By the use of my invention, deck space may be economized, and the boats may be rapidly and positively moved to their inboard and outboard positions.

In the accompanying drawings, I have illustrated a preferred embodiment of my invention.

Figure 1 is a side elevation of the mechanism embodying my invention. Fig. 2 is a rear elevation of the same. Fig. 3 is an elevation of mechanism embodying my invention showing the side opposite to Fig. 1.

Referring to the drawings, A indicates a davit preferably curved as shown. The lower end of the davit A is preferably pivoted as shown at $a$ to a frame D at one side thereof. Rigidly secured at one side to said davit A in any suitable manner is a rearwardly extending arm B having at its lower edge a toothed rack $b$. The said arm B, as shown, also extends laterally a short distance to permit the free engagement of said rack.

C indicates another toothed rack suitably supported on the frame D which is fixed to the vessel, the teeth of the rack C opposing the teeth of the rack $b$. At the side of the frame D opposite to the davit, a supporting bar E is pivoted at its lower end on the same pivot as the davit A, and extends upwardly. Suitably supported at the upper end of said bar E and journaled in suitable bearings is a shaft F having a worm $f$. This worm $f$ meshes with a gear wheel G which is fast on a shaft $g$. Said shaft $g$ is likewise journaled in suitable bearings and supported by the bar E. Also fast on the shaft $g$ and rotating therewith is a pinion H which is interposed between and meshes with the racks C and $b$. A crank wheel I is fixed to the worm shaft E.

A casing J substantially incloses the gear wheel and worm and prevents dirt from gathering therein.

It is obvious that when the shaft F is rotated by means of the crank wheel I the worm carried by said shaft will move the gear wheel G and its shaft $g$, which in turn will rotate the pinion H. The teeth of the pinion H engaging the fixed rack C at one side and the rack $b$ at the other side will cause the said rack $b$ and with it the pivoted davit to be moved either inboard or outboard, according to the direction in which said shaft F is rotated.

It is obvious that many modifications may be made without materially departing from the spirit of my invention.

Having described my invention what I claim is:

1. The combination of a davit pivoted to swing, an arm carried by said davit, a support fixed to the vessel, and an intermediate member engaging both said support and arm and adapted to travel transversely between the same and relatively to each thereof.

2. The combination of a davit pivoted at its lower end to swing, a rack secured to the davit, another rack suitably supported on the vessel, a pinion interposed between and engaging with said two racks, and means for actuating said interposed pinion to swing the davit.

3. The combination of a davit pivoted at its lower end to swing, an arm secured to said davit and having a rack, another rack having its teeth opposing the teeth of said first rack and prevented from moving with the davit, a pinion interposed between said two racks and geared to a worm, movable supporting means for said gear and worm, and means for rotating the worm to swing the davit on its pivot.

4. The combination of a davit pivoted at its lower end, a rearwardly extending arm rigidly secured to said davit, a rack at the lower edge of said arm, a frame fixed to the vessel, a rack supported by said frame and having its teeth opposing the teeth of the first rack, a pinion interposed between said two racks, a gear wheel secured to rotate with said interposed pinion, a worm meshing with said gear wheel, movable supporting means for said gear wheel and worm, and means for rotating said worm.

5. The combination of a davit pivoted at its lower end, a rearwardly extending arm rigidly secured to said davit, a rack at the lower edge of said arm, a frame fixed to the vessel, another rack supported by said frame and having its teeth opposing the teeth of the first rack, a pinion interposed between said two racks, a gear wheel fixed to the same shaft and rotating with said interposed pinion, a worm meshing with said gear wheel, a supporting bar pivoted to the vessel for supporting said gear and worm, and means for rotating said worm.

6. The combination of a davit pivoted at its lower end to a frame fixed to the vessel, a rearwardly extending arm rigidly secured to said davit, a rack secured to the lower edge of said arm, another rack supported in said frame and having its teeth opposing the teeth of the first rack, a pinion interposed between said racks, the teeth of which engage at opposite sides with the teeth of the said two racks, a gear wheel fixed to the same shaft and rotating with said interposed pinion, a worm meshing with said gear wheel, a bar pivoted on the same pivot as the davit for movably supporting said gear and worm, and a crank wheel for rotating said worm.

7. The combination of a davit adapted to swing on a horizontal pivot, two segmental racks having their centers on or substantially in line with said horizontal pivot, one of the same being rigidly secured to the davit and the other being suitably supported and immovable, a pinion arranged intermediate said racks and engaging both of the same, and means for actuating the said pinion to swing the davit.

8. The combination of a davit pivoted to swing, a support fixed to the vessel, an arm carried by the davit and extending substantially parallel to said support, and an intermediate member engaging both said support and arm and adapted to travel transversely between the same.

In witness whereof, I have signed my name to the foregoing specification in the presence of two subscribing witnesses.

AXEL WELIN.

Witnesses:
F. L. RAND,
H. D. JAMESON.